(12) United States Patent
Shen

(10) Patent No.: US 6,236,490 B1
(45) Date of Patent: May 22, 2001

(54) DUAL STAGE DEFORMABLE MIRROR

(75) Inventor: Gon-Yen Shen, Brookfield, CT (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/478,159

(22) Filed: Jan. 5, 2000

(51) Int. Cl.[7] ................. G02F 1/03; G02F 1/07; G02B 5/08; G02B 7/182
(52) U.S. Cl. ............ 359/247; 359/846; 359/872
(58) Field of Search .......................... 359/247, 846, 359/849, 871, 872

(56) References Cited

U.S. PATENT DOCUMENTS 5,274,479 * 12/1993 Zmek et al. .............. 359/15
5,864,215 * 1/1999 Shen et al. ............... 318/60

* cited by examiner

Primary Examiner—Ricky Mack

(57) ABSTRACT

A multistage stage deformable mirror structure (10) includes a backup structure (12) having a support surface; a single mirror facesheet (18) having an optical surface (18A); and, interposed between the support surface and the optical surface, at least one intermediate deformable structure (14) that is coupled at a first surface to the support surface through a first set of linear actuators (16) for being deformed by the set first set of actuators. The at least one intermediate deformable structure is also coupled at a second opposing surface to the optical surface through a second set of linear actuators (20) for deforming the optical surface. The optical surface assumes a shape that is a combination of the deformation imparted to the at least one intermediate deformable structure by the first set of linear actuators, and the deformation imparted to it by the second set of linear actuators. The first set of linear actuators have a wider dynamic range than the second set of linear actuators, and the optical surface is deformed so as to simultaneously compensate an incident wavefront for both large and small magnitude and low and high temporal and spatial frequency wavefront errors. The first set of linear actuators operate with a lower bandwidth, and are spaced at wider intervals, than the second set of linear actuators.

9 Claims, 1 Drawing Sheet

DUAL STAGE DEFORMABLE MIRROR

FIELD OF THE INVENTION

This invention relates generally to optical systems and methods and, more particularly, to the field of deformable mirrors used in adaptive optical systems for compensating a wavefront for errors induced by atmospheric and other disturbances.

BACKGROUND OF THE INVENTION

In a number of optical systems, including those used for high energy laser applications, a beam control system is required to correct a wavefront for wavefront errors generated internally by the system, as well as for external disturbances. The wavefront errors can be large in magnitude and can exhibit a varying spatial and temporal frequency content.

As an example, in airborne laser applications the large magnitude/low frequency errors can be attributed to a boundary layer near the conformal window, while the small magnitude/high frequency (spatial and temporal) error can be attributed to atmospheric turbulence.

As another example, in a wide field of view (WFOV) application the large magnitude/lower frequency wavefront error can originate in a field-dependent WFOV beam expander, while the smaller magnitude/higher frequency wavefront error may originate in the laser and beam control system.

Referring to FIG. 1, a conventional technique to compensate for these wavefront errors employs two deformable mirrors 1 and 2. Mirror 1 is used to compensate for the large magnitude/low frequency error (low bandwidth (BW)), while mirror 2 is used to compensate for the smaller magnitude/higher frequency error (high BW). Deformable mirror 1 includes a base plate or backup structure 3 that supports a plurality of first actuators 5, which in turn support a facesheet 4 having a reflective surface 4A. Deformable mirror 2 is similarly constructed to include a backup structure 6 that supports a plurality of second actuators 8, which in turn support a facesheet 7 having a reflective surface 7A.

In general, the first actuators 5 will provide a larger range of linear motion (wider dynamic range), but with longer response time (lower BW), than the second actuators 8. A beam 9 to be wavefront corrected must therefore be directed so as to impinge on both surfaces 4A and 7A, with the large magnitude/lower frequency wavefront error being corrected by the low BW mirror 1, while the smaller magnitude/higher frequency wavefront error is corrected by the high BW mirror 2.

It can be seen that this approach to wavefront correction increases the complexity, mass, volume and cost of the system by requiring two mirror structures, with additional transfer optics (not shown) for directing the beam between the two mirror structures.

OBJECTS AND ADVANTAGES OF THE INVENTION

It is a first object and advantage of this invention to provide an improved deformable mirror system that overcomes the foregoing and other problems.

It is a further object and advantage of this invention to provide a dual stage deformable mirror structure that requires only one backup structure, and only one reflective surface, for simultaneously compensating a wavefront of interest for both the large magnitude/lower frequency wavefront errors and the smaller magnitude/higher frequency wavefront errors.

SUMMARY OF THE INVENTION

The foregoing and other problems are overcome and the objects and advantages are realized by methods and apparatus in accordance with embodiments of this invention.

A multistage deformable mirror structure is constructed and operated so as to simultaneously compensate an incident wavefront for both large and small magnitude and low and high temporal and spatial frequency wavefront errors with a dual stage device. In accordance with this invention a mirror facesheet is provided that is supported by and deformed with a set of high bandwidth actuators that are closely spaced together. The set of high bandwidth, closely spaced actuators are supported by an intermediate deformable structure which, in turn, is supported by and deformed with a set of larger dynamic range actuators. The set of larger dynamic range actuators operate with a lower bandwidth, and are spaced at wider intervals than the set of high bandwidth actuators. As the intermediate structure is deformed, the deformed shape is transmitted through the closely spaced, high bandwidth actuators and deforms the mirror facesheet so as to correct for the large magnitude/lower frequency wavefront errors. Simultaneously, the set of high bandwidth, closely spaced actuators are selectively operated to compensate an incident wavefront for the smaller magnitude/higher frequency wavefront errors. The single mirror facesheet is thus simultaneously deformed and given a shape suitable for compensating the incident wavefront for the large and small magnitude and low and high temporal and spatial frequency wavefront errors.

A multistage deformable mirror structure, in accordance with the teachings of this invention, includes a backup structure having a support surface; a mirror facesheet having an optical surface; and, interposed between the support surface and the optical surface, at least one intermediate deformable structure that is coupled at a first surface to the support surface through a first set of linear actuators for being deformed by the set first set of actuators. The at least one intermediate deformable structure is also coupled at an opposing second surface to the optical surface through a second set of linear actuators for deforming the optical surface. The optical surface assumes a shape that is a combination of the deformation imparted to the at least one intermediate deformable structure by the first set of linear actuators, and the deformation imparted to it by the second set of linear actuators.

The first set of linear actuators have a wider dynamic range than the second set of linear actuators, and the optical surface is deformed so as to simultaneously compensate an incident wavefront for both large and small magnitude and low and high temporal and spatial frequency wavefront errors. The first set of linear actuators operate with a lower bandwidth, and are spaced at wider intervals, than the second set of linear actuators.

Also disclosed is a method for simultaneously compensating a wavefront for large magnitude/low frequency error and small magnitude/high frequency error. This method includes steps of: (a) directing the wavefront to an optical surface of a facesheet of a deformable mirror structure; and (b) simultaneously deforming the optical surface with a first set of actuators, applied through an intermediate deformable structure, and with a second set of actuators that are mounted on the intermediate deformable structure.

The step of simultaneously deforming includes a step of varying the linear extension of individual ones of the second set of actuators at a higher rate than the linear extension of the first set of actuators is varied. In this manner the second set of actuators are operated to deform the optical surface for correcting for the small magnitude/high frequency error, while the first set of actuators are operated to simultaneously deform the optical surface for correcting for the larger magnitude/lower frequency error.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2:
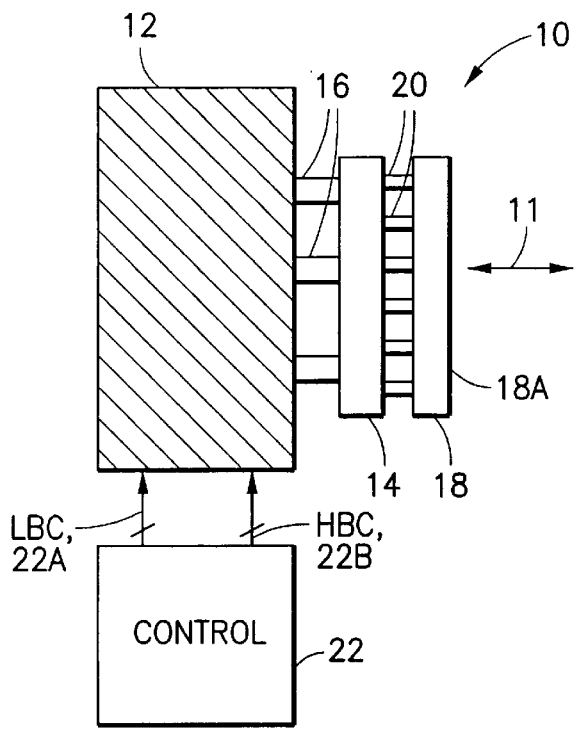
FIG. 2 is a cross-sectional view (not to scale) of a dual stage deformable mirror system in accordance with the teachings of this invention.

Reference is made to FIG. 2 for illustrating a dual stage deformable mirror structure 10 that is constructed and operated so as to simultaneously compensate an incident wavefront of a beam 11 for both large and small magnitude and low and high temporal and spatial frequency wavefront errors. The beam 11 may be a high energy laser beam, or any beam that has a wavefront susceptible to wavefront errors that are desired to be corrected.

The dual stage deformable mirror structure 10 includes a single backup structure 12 made of any suitable rigid material. Supported on a major surface of the backup structure 12 is a set of large dynamic range linear actuators 16 which could be, by example, lead screw, linear stepper motor, Lead/Magnesium/Niobate (PMN) actuators, or PZT actuators. An exemplary range of motion for the actuators 16 is ±10 micrometers to ±50 micrometers, and they may exhibit a bandwidth in the range of about 5 Hz to about 20 Hz. The set of large dynamic range actuators 16 in turn support an intermediate structure 14, Intermediate structure 14 can be comprised of, by example, metal, glass or some ultra low expansion (ULE) material. In general, the thickness of the intermediate structure may be in the range of about 2.5 millimeters to about 20 millimeters, while the selected thickness is generally a function of the number of actuators 16 (i.e., as fewer actuators are used the structure 14 is made thinner, and vice versa.)

Further in accordance with this invention, a mirror facesheet 18 is supported by and deformed with a set of high bandwidth actuators 20 that are more closely spaced together than the actuators 16. The set of high bandwidth, closely spaced actuators 20 are supported by the intermediate deformable structure 14 which, as was just explained, is supported by and deformed with the set of large dynamic range actuators 16. The set of large dynamic range actuators 16 operate with a lower bandwidth, and are spaced at wider intervals, than the set of high bandwidth actuators 20. As the intermediate structure 14 is deformed, the deformed shape is transmitted through the closely spaced, high bandwidth actuators 20 and deform the mirror facesheet 18 so as to correct the incident wavefront of beam 11 for the large magnitude/lower frequency wavefront errors. Simultaneously, the set of high bandwidth, closely spaced actuators are selectively operated to compensate the incident wavefront of beam 11 for the smaller magnitude/higher frequency wavefront errors. The single mirror facesheet 18 is thus simultaneously deformed and given a shape suitable for compensating the incident wavefront for the large and small magnitude and low and high temporal and spatial frequency wavefront errors.

In the preferred embodiment of this invention the mirror facesheet is comprised of ULE, or ZERODUR™, or silicon, or glass, or any suitable material. A suitable thickness is in the range of about 0.7 millimeters to about 2 millimeters. The actuators 20, in the preferred embodiment of the invention, are PMN actuators that exhibit an exemplary range of linear motion of ±2 micrometers, and they may exhibit a bandwidth in the range of about 500 Hz to about 1000 Hz. Other types of actuators could be used as well.

The facesheet 18 has a reflective surface 18A. The reflective surface could contain a film of aluminum, or silver, or gold, or any suitable material. It is also within the scope of this invention to prove the surface 18A of the facesheet 18 as a multi-layer stack (similar to an interference filter), thereby providing some degree of wavelength selectivity. In general, the surface 18A may be referred to herein as an optical surface.

A controller 22 is responsive to an indication of wavefront errors (which may be generated in a conventional fashion, such as by monitoring the wavefront of the beam) to generate low bandwidth control (LBC) signals 22A for controlling individual ones of the actuators 16, as well as high bandwidth control (HBC) signals 22B for controlling individual ones of the actuators 20.

In operation, the controller 22 determines the required mirror shape, then drives the actuators 16 to deform the facesheet 18 to compensate for the large magnitude disturbances, and then drives the actuators 20 to further deform the facesheet 18 to compensate for the smaller magnitude disturbances. The controller 22 then monitors and tracks the disturbances, and adaptively changes the actuator drive signals accordingly, with the actuators 20 being driven and updated at a significantly higher rate than the low bandwidth actuators 16.

Figure 1:
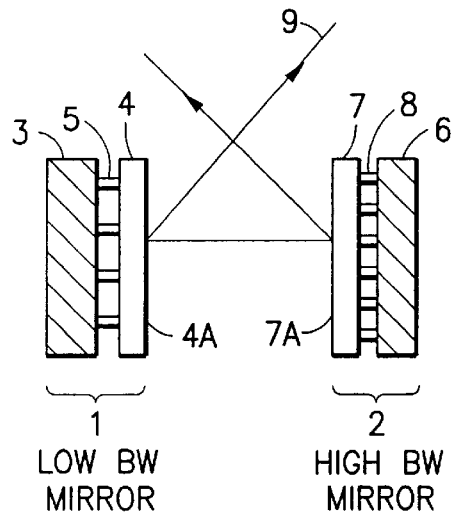
FIG. 1 is a cross-sectional view (not to scale) of a prior art two mirror system used for compensating an incident wavefront for both large magnitude/low frequency wavefront errors and smaller magnitude/higher frequency wavefront errors.
Figure 3A:
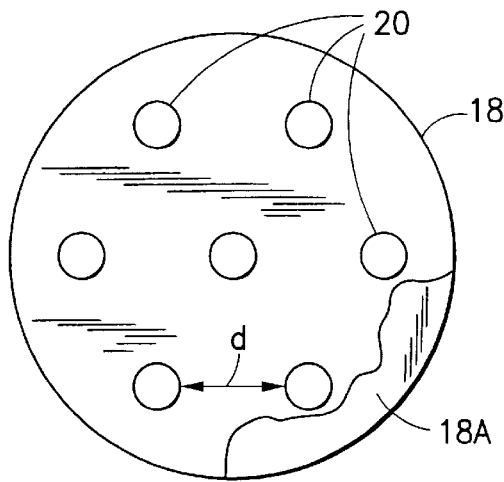
FIGS. 3A and 3B are each a top view showing a portion of the facesheet of the dual stage mirror of FIG. 2, with the remaining portion being cut-away for revealing two exemplary patterns of the underlying high frequency actuators.
Figure 3B:
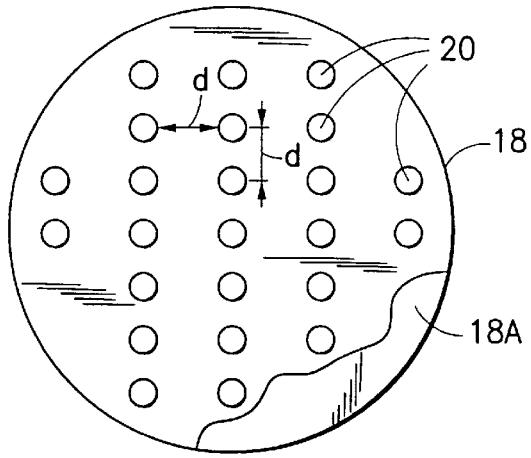

FIG. 3A illustrates an exemplary circular shape for the facesheet 18, and also shows a first, hexagonal layout pattern for the array of actuators 20. In practice, multiple concentric hexagonal patterns of actuators 20 may be employed. FIG. 3B shows an alternative, generally square grid layout pattern for the actuators 20. For an exemplary case where the diameter of the facesheet 18 is in the range of about 10 centimeters to about 30 centimeters, the distance (d) between actuators 20 can be in the range of about 0.7 centimeters to about 1.5 centimeters. The lower bandwidth actuators 16 may be laid out in the same pattern as the higher bandwidth actuators 20, but the distance between the actuators 16 is typically made about three to about five times the distance between the actuators 20. As an example, and assuming the square grid pattern of FIG. 3B with the actuators 20 being spaced 1 centimeter apart, then the actuators 16 could be spaced 3 centimeters apart to 5 centimeters apart. The number of and spacing between the actuators 16 is taken into account when determining the thickness of the intermediate structure 14.

In any of these embodiments a preferred technique to join the actuators 16 and 20 to their supporting and supported surfaces is with an adhesive (epoxy) bond, although other suitable fastening techniques could be used.

While described above in the context of a dual stage deformable mirror structure, those skilled in the art should appreciate that these teachings can be extended to encompass three stage and higher deformable mirror structures. These higher level mirror structures would employ multiple intermediate structures, with at least one that is supported and deformed by an underlying set of actuators, while supporting another set of actuators for deforming and supporting an overlying intermediate structure. The teachings of this invention are also not intended to be limited in scope by any of the exemplary dimensions, materials, actuator types, mirror shapes, actuator layout patterns or other specific embodiments that were disclosed above.

As such, while the invention has been particularly shown and described with respect to preferred embodiments thereof, it will be understood by those skilled in the art that changes in form and details may be made therein without departing from the scope and spirit of the invention.

What is claimed is:

1. A multistage deformable mirror structure, comprising:

a backup structure having a support surface;

a mirror facesheet having an optical surface; and interposed between said support surface and said optical surface, at least one intermediate deformable structure that is coupled at a first surface to said support surface through a first set of linear actuators for being deformed by said set first set of actuators, said at least one intermediate deformable structure also being coupled at a second opposing surface to said optical surface through a second set of linear actuators for deforming said optical surface, wherein said optical surface assumes a shape that is a combination of the deformation imparted to said at least one intermediate deformable structure by said first set of linear actuators and the deformation imparted to it by said second set of linear actuators.

2. A multistage deformable mirror structure as in claim 1, wherein said first set of linear actuators have a wider dynamic range than said second set of linear actuators, and wherein said optical surface is deformed so as to simultaneously compensate an incident wavefront for both large and small magnitude and low and high temporal and spatial frequency wavefront errors.

3. A multistage deformable mirror structure as in claim 1, wherein said first set of linear actuators operate with a lower bandwidth, and are spaced at wider intervals, than said second set of linear actuators.

4. A method for compensating a wavefront for large magnitude/low frequency error and small magnitude/high frequency error, comprising steps of:

directing the wavefront to an optical surface of a facesheet of a deformable mirror structure; and simultaneously deforming the optical surface with a first set of actuators, applied through an intermediate deformable structure, and with a second set of actuators that are mounted on said intermediate deformable structure.

5. A method as in claim 4, wherein step of simultaneously deforming includes a step of varying the linear extension of individual ones of the second set of actuators at a higher rate than the linear extension of the first set of actuators is varied, whereby the second set of actuators are operated to deform the optical surface for correcting for the small magnitude/high frequency error, while the first set of actuators are operated to simultaneously deform the optical surface for correcting for the larger magnitude/lower frequency error.

6. A dual stage deformable mirror structure for correcting wavefront errors in an incident laser beam, comprising:

a single backup structure having a support surface;

a single mirror facesheet having an optical surface; and interposed between said support surface and said optical surface, an intermediate deformable structure that is coupled at a first surface to said support surface through a first set of linear actuators for being deformed by said set first set of actuators, said intermediate deformable structure also being coupled at a second opposing surface to said optical surface through a second set of linear actuators for deforming said optical surface, wherein said optical surface assumes a shape that is a combination of the deformation imparted to said at least one intermediate deformable structure by said first set of linear actuators and the deformation imparted to it by said second set of linear actuators; wherein said first set of linear actuators have a wider dynamic range than said second set of linear actuators, and wherein said optical surface is deformed so as to simultaneously compensate said wavefront of said incident laser beam for both large and small magnitude and low and high temporal and spatial frequency wavefront errors.

7. A multistage deformable mirror structure as in claim 6, wherein said first set of linear actuators operate with a lower bandwidth, and are spaced at wider intervals, than said second set of linear actuators.

8. A multistage deformable mirror structure as in claim 7, wherein said first set of linear actuators are spaced apart about three times to about five times a spacing between said second set of linear actuators.

9. A multistage deformable mirror structure as in claim 6, wherein said second set of linear actuators are comprised of PMN actuators.

\* \* \* \* \*